United States Patent Office 3,035,881
Patented May 22, 1962

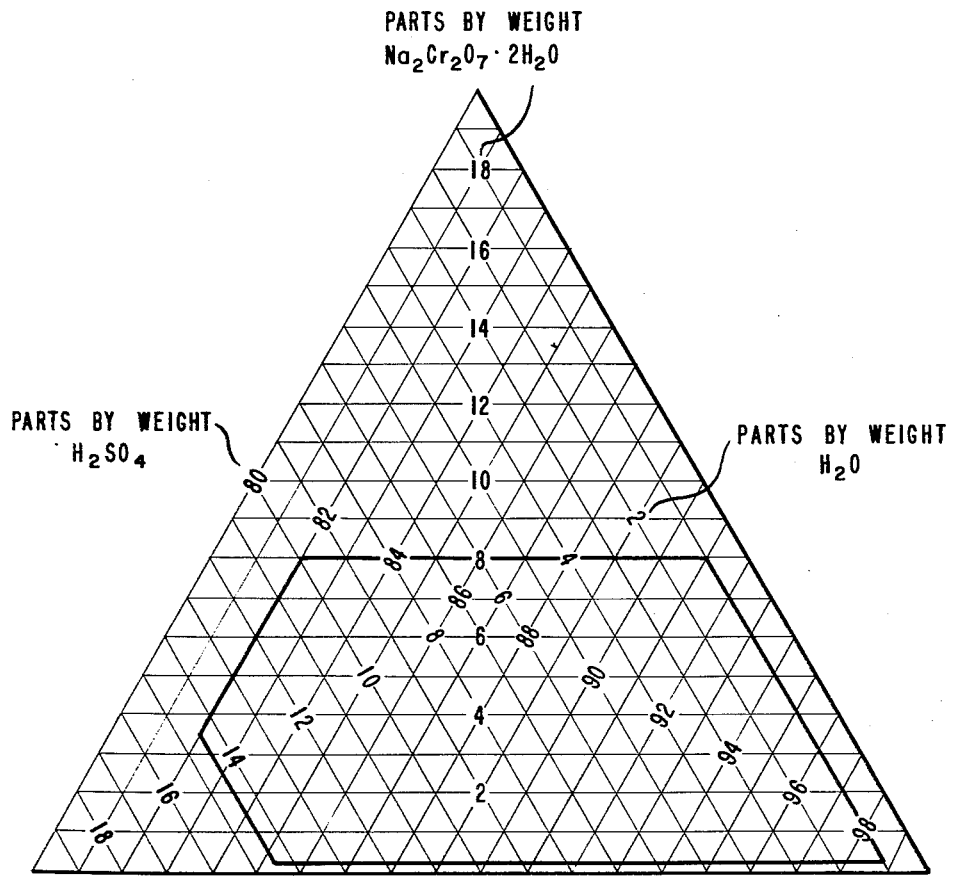

3,035,881
PROCESS FOR TREATING SHAPED ARTICLES
Abraham Bernard Cohen, Springfield, and Robert Bernard Heiart, Middletown, N.J., assignors to E. I. du Pont de Nemours and Company, Wilmington, Del., a corporation of Delaware
Filed Jan. 7, 1960, Ser. No. 1,124
8 Claims. (Cl. 8—55)

This invention relates to a process for treating shaped articles prepared from highly polymeric polyesters. More particularly it relates to a process for imparting hydrophilic properties to the surfaces of said shaped articles by treatment with a chromic acid solution followed by the impregnation of said treated surface with various materials. Specifically, it relates to the impregnation of the chromic acid treated surfaces with dyes and light sensitive materials.

Highly polymeric polyesters are used extensively in the preparation of shaped articles, e.g., films and fibers. The polyesters are well known for their strength, dimensional stability, high tenacity, flexibility crease resistance, low moisture absorption, etc. The polyesters have certain disadvantages, however. In film form, their hydrophobic character and insolubility in conventional solvents have made it difficult to coat the surface of the film with light-sensitive layers, e.g., diazo layers. Subbing layers have aided adhesion but to apply said layers is time consuming and adds to the film cost. In film and fiber form, polyesters have the disadvantage of being extremely difficult to dye or to print a pattern on the surface. Various treatments have been used to improve dyeability with apparent success, but the processes in general, are time consuming and costly.

An object of this invention is to provide a new process for dyeing shaped articles prepared from synthetic linear polyesters. Another object is to provide such a process which does not require the use of expensive treating apparatus. Yet another object is to provide such a process which does not require coating sublayers of polymers of the non-water permeable type on the polymeric films or time consuming or expensive treatments on the fibers or filaments. Still further objects will be apparent from the following description of the invention.

It has been discovered that improved shaped articles can be prepared, in accordance with this invention, by (a) treating the surface, or surfaces, of said shaped articles comprising a polyester of (1) at least one glycol of the formula $HOCH_2—W_n—CH_2OH$ where W is a divalent hydrocarbon radical taken from the group consisting of methylene, unsubstituted and alkyl-substituted polymethylene radicals of 1 to 8 carbon atoms and a cycloalkylene radical of 5 to 6 carbon atoms, and $n$ is a number taken from the group consisting of 0 and 1, and (2) one or more aliphatic or aromatic dicarboxylic acids wherein at least 15 mole percent is terephthalic acid and up to 20 mole percent can be at least one aliphatic dicarboxylic acid, with a treatment solution comprising 82.0 to 98.8 parts by weight of $H_2SO_4$, 1.0 to 14.5 parts by weight of water and an amount of chromic acid yielding compound equivalent to 0.1 to 4.0 parts by weight of $Cr_2O_3$ (b) contacting the surface or surfaces of the treated shaped article with an excess of water and (c) contacting a wet surface with an aqueous solution comprising a basic dye, a disperse dye or a diazo compound. The shaped article which has been impregnated by the diazo compound can be exposed to a line drawing by means of a suitable light source and developed in a conventional manner to yield a diazo image.

The shaped articles after treatment with the chromic acid solution and prior to treatment with the dye or diazo solution can be further treated, if desired, by contacting the treated surface or surfaces with a 0.5 to 30% aqueous alkali metal hydroxide solution, preferably NaOH or KOH, at a temperature of 5° to 80° C. for approximately 1 second or more, and preferably, for about 10 to 60 seconds whereby essentially colorless hydrophilic surfaces are obtained. The shaped articles can then be washed with water in order to remove excess alkali and are dried.

In another embodiment of the invention the shaped article after the chromic acid treatment and washing with water can be dried. Subsequently, the treated shaped article can be treated with a dye solution at elevated temperatures, e.g., at the boiling point of the dye used.

In general, when the shaped article is brought into contact with, immersed in, or passed through the treatment solution, the surface area is in contact with said solution for at least about 0.01 second. The shaped articles can be treated for up to about 60 seconds. These time periods vary with the shape and size of the article and the composition of said article, the depth of treatment desired, the composition of the acid treatment solution, the temperature of said solution and the manner in which the polymeric article is brought into contact with the acid treatment solution. The temperature of the treatment solution can range from 0 to about 60° C. or more, preferably 5 to 30° C.

The chromic acid treatment solution ranges are as follows:

82 to 98.8 parts by weight of $H_2SO_4$, 1 to 14.5 parts by weight of $H_2O$ and an amount of chromic acid-yielding compound equivalent to 0.1 to 4.0 parts by weight of $Cr_2O_3$.

In the attached drawing, a triangular co-ordinate graph which constitutes a part of this application, the pentagonal area encompasses the broad range of concentration for the three constituents of a preferred treatment bath. The broad composition ranges are described as follows:

82.0 to 98.8 parts by weight of $H_2SO_4$, 1.0 to 14.5 parts by weight of $H_2O$, and 0.2 to 8.0 parts by weight of $Na_2Cr_2O_7 \cdot 2H_2O$.

After the acid treated articles are washed they can be treated with basic dye, dispersed dye and diazo solutions, or the shaped articles can be dried and treated with said solutions at elevated temperatures. The shaped articles can be bleached after the chromic acid treatment with an aqueous alkali metal hydroxide solution.

The invention will be further illustrated, but is not intended to be limited by the following examples:

*Example I*

Three 5-inch by 7-inch sheets of uncoated, oriented polyethylene terephthalate film, 4 mils in thickness, were treated for 5 seconds with a chromic acid treatment solution cooled to 5° C. and containing 50 g. of $Na_2Cr_2O_7 \cdot 2H_2O$ in 500 ml. of $H_2SO_4$ (95 to 98% acid, S.G. 1.8407–1.8437 at 60° F.). Immediately after the acid treatment, the films were transferred to a quiescent water bath (15° C.) where the excess acid, salts and other water soluble materials were removed from the surface. The treated films were allowed to dry and then were bleached for 2 minutes in a 15 percent aqueous solution of NaOH and washed in cold running tap water. The wet samples were immediately immersed for 5 minutes at room temperature in a solution consisting of 5 g. of the double salt of zinc chloride and para-diethylaminobenzene diazonium chloride $(C_{10}H_{14}N_3Cl)_2 \cdot ZnCl_2$, in 100 ml. of water. The sheets were then removed, blotted and hung to dry. The diazotype sheets were exposed for a period of ½, 3 and 5 minutes respectively through a line transparency to a 275-watt General Electric R. S. Sunlamp maintained at a distance of 4.5 inches from the film. The exposed sheets were developed for 15 seconds each in a saturated solution of beta-naphthol to which aqueous NaOH had been added to raise the pH to about 10. After developing, the film sheets were rinsed in water and dried. An intense brown, color-fast positive image of the transparency was produced on each of the films.

*Example II*

A 5-inch by 7-inch sheet of polyethylene terephthalate film described in Example I was treated for 5 seconds with a chromic acid solution cooled to 5° C. and containing 6 g. of $Na_2Cr_2O_7 \cdot 2H_2O$ in 50 ml. of $H_2SO_4$ described in Example I. The treated film was then placed in a quiescent water bath (15° C.) and dried. The film was then dyed for 2 minutes at the boil in a concentrated, aqueous solution of Malachite Green dye (CI 42000). The dyed film was then washed for 1 hour in running tap water, a deep bluish-green color remaining on the treated sheet. A control film sheet, treated in a similar manner except that the sheet was not treated with chromic acid, did not retain any dye.

*Example III*

A 6-inch wide roll of polyethylene terephthalate film as described in Example I was treated continuously. By means of electrically driven pull rolls, one surface of the film base was brought into contact for 5 seconds with a treatment solution consisting of 300 ml. of conc. $H_2SO_4$ described in Example I and 25 g. of $Na_2Cr_2O_7 \cdot 2H_2O$. The treated film travelled immediately by means of rollers to a non-turbulent, cold water bath where the film was washed for 35 seconds and then the film travelled for 30 seconds through an aqueous dye solution containing 1% by weight Rhodamine 6GDN (CI 45160). The dyed film finally travelled to another wash station where the film was washed with running water for 20 seconds, excess water being blown off by the use of compressed air, and was wound. An intensely bluish-red colored, translucent, hydrophilic film was the result.

*Example IV*

Three sheets of wet, bleached, translucent chromic acid treated polyethylene terephthalate film, 4 mil in thickness, prepared as described in Example I were immersed for 5 minutes in a solution containing 8 g. of the zinc chloride double salt of zinc chloride and p-diethylaminobenzene diazonium chloride, 8.7 g. of 1-naphthol-5,6-sulfonic acid and 60 ml. of water. The films were then removed from the treatment solution, blotted to remove surface solution and hung to dry. The three sheets were exposed for 1.5, 3 and 5 minutes respectively through a line transparency to a 275-watt General Electric R.S. Sunlamp maintained at a distance of 4.5 inches from the film as described in Example I. The sheets were then exposed to the vapors from a concentrated ammonium hydroxide solution for 5 minutes. An intense, color fast positive image of the original transparency was formed.

*Example V*

A 6-inch wide roll of polyethylene terephthalate film as described in Example I was treated continuously, as described in Example III, with a chromic acid solution consisting of 32 g. of $Na_2Cr_2O_7 \cdot 2H_2O$ and 416 ml. of concentrated $H_2SO_4$ described in Example I. The film base was then treated by passing through a cold water wash for 35 seconds, a 20 percent aqueous solution of NaOH for 20 seconds, and another 35 second cold water wash. A 6-inch by 6-inch strip of the treated film was immersed for 60 seconds in a 1 percent by weight solution of Rhodamine 6GDN dye (CI 45160) and was then washed in cold water. A brilliantly dyed film was the result.

Two 6-by 6-inch samples of the above treated film were kept wet for 24 hours and 3 weeks respectively and then dyed as described above in this example. Similar results were obtained.

A fourth sample of treated film was dried for 15 minutes in air and was dyed as described in this example. Only a faint dye tint was obtained on the film.

A fifth sample of treated film was dried in air for 15 minutes and then was dyed at the boil for 15 minutes. A deeply dyed film was obtained.

*Example VI*

Polyethylene terephthalate film was treated as described in Example I of Assignee's Heiart application Serial No. 789,252 filed January 27, 1959. The bleached, translucent film base was dried in air overnight after which it was immersed for 2 minutes in a concentrated solution of Malachite Green (CI 42000). The dyed film base was then washed in cold water and dried in air. A strongly dyed translucent film green in color was obtained.

*Example VII*

A 6-inch wide roll of polyethylene terephthalate film as described in Example I was treated continuously in a machine as described in Example III. The initial contact was for 5 seconds in a treatment solution consisting of 4 g. of $Na_2Cr_2O_7 \cdot 2H_2O$, 8.4 g. of water and 87.6 g. of concentrated $H_2SO_4$ as described in Example I. The treated film was then washed for 35 seconds in cold water and the excess water was removed by air jets. The film obtained was transparent and slightly yellow in color. The film was then immersed for 30 seconds in a 0.1% aqueous solution of Methylene Blue Chloride (CI 52015) and then washed in cold running water (15° C.). A richly dyed blue transparent film was obtained.

*Example VIII*

Three six-by six-inch sheets of film base as described in Example I were treated for 5 seconds each in the chromic acid treatment solution described in Example III. While still wet with water, one of the sheets was immersed for 60 seconds in a saturated dye solution of Rhodamine 6GDN aqueous at 28° C. The film sheet was then washed in cold running water and was allowed to dry in air. A film sheet was obtained that had a deep brick-red color. A sheet of film base as described in Example I, but untreated, was dyed in a similar fashion. This film sheet did not dye. The other two sheets of treated film were allowed to dry in air for 1 hour. One was dyed as desceibed above in this example. Only a faint coloration was obtained. The second dried film sheet was soaked in water overnight and was then dyed as described above in this example. A satisfactory dye coloration was obtained, but the color was not as bright as the film sheet which was not allowed to dry.

*Example IX*

Yarn prepared from polyethylene terephthalate (140 denier, 127 filaments, 0 twist) was wound in a single layer on a 2-inch by 3-inch glass microscope slide. Eight slides of this type were prepared. Six of the samples were treated in a chromic acid treatment solution consisting of 5 g. of $Na_2Cr_2O_7 \cdot 2H_2O$ in 50 ml. of concentrated $H_2SO_4$ described in Example I as follows:

| Samples: | Time, seconds |
|---|---|
| 1 and 2 | 1 |
| 3 and 4 | 5 |
| 5 and 6 | 15 |

Samples 7 and 8 were left untreated as controls. After the above treatments the samples were washed thoroughly in cold water, blotted to remove excess water and were allowed to dry in air. The treated yarns were a brownish-yellow in color. The samples treated for 15 seconds were discarded because the treatment had dissolved some of the yarn fibers. All the samples, i.e., 1 to 4 and 7 and 8 were dyed at the boil for 3 minutes in a concentrated aqueous solution of Malachite Green (CI 42000) followed by a cold water wash. One untreated sample and one each of the samples treated for 1 and 5 seconds respectively were blotted and allowed to dry in air. The chromic acid treated fibers were a deep blue-green color while the untreated sample (control) had only a faint blue tint. The remaining two treated samples and the control were agitated for 15 minutes in soap and water at 85° C., rinsed in water and dried. The treated samples were dark green in color while the untreated control sample was colorless. No color differences were noted between the 1 and 5 second chromic acid treated samples.

*Example X*

Four 10-inch lengths of a polyester fiber described in Lappin et al. U.S. Patent 2,835,648 and prepared using cyclohexane-1,4-dimethanol were wrapped around glass slides to support the fiber. The first fiber was treated for 5 seconds at room temperature in a solution consisting of 390 g. of 94.9% $H_2SO_4$ and 15 g. of $Na_2Cr_2O_7 \cdot 2H_2O$. The fiber was washed for 5 minutes in running water immediately after treatment. The fiber was then treated in a 1% aqueous solution of Malachite Green (CI 42000) for 20 seconds at room temperature followed by a 5-minute water wash. The fiber was a deep bluish-green color. Fiber number two was treated in the same manner as fiber one, but after the treatment and wash the fiber was bleached for 60 seconds in a 20% by weight aqueous solution of NaOH and then dyed with the Malachite Green. Results similar to those of the first treatment were obtained. A third fiber was treated directly for 60 seconds with a 20% by weight aqueous solution of NaOH, washed in running water for 5 minutes and dyed as described above. The fiber after this treatment had only a very faint blue tint. A fourth fiber was treated directly with a 1.0% Malachite Green solution. The fiber after this treatment had only a faint blue tint. This example demonstrates that the chromic acid or chromic acid plus NaOH bleach treatments are effective in improving the dyeability of the polyester fiber.

*Example XI*

Four 5-inch by 7-inch sheets of a polyester film prepared by reacting ethylene glycol and 85% by weight of terephthalic acid and 15% by weight of isophthalic acid as described in British Patent 766,290 were treated at room temperature as follows:

Film one was treated for 10 seconds in the treatment bath described in Example X followed by washing in running water for 5 minutes and dyeing for 20 seconds in a 1% by weight solution of Malachite Green. A deep bluish-green colored film was obtained.
Film two was treated in the same manner as film one except that after the chromic acid treatment and water wash the film was bleached for 60 seconds in a 20% by weight solution of NaOH before dyeing. After dyeing, a deep bluish-green colored film was obtained.
Film three was treated for 60 seconds in a 20% by weight solution of NaOH, washed for 5 minutes in running water and then dyed as described above. The film was colorless.
Film four was dyed for 20 seconds in the 1% by weight Malachite Green solution described above. Again the film was colorless.

*Example XII*

A 5-inch by 7-inch sheet of uncoated, oriented polyethylene terephthalate film as described in Example I was treated for 5 seconds at room temperature with the chromic acid treatment solution described in Example X followed by quenching in water for 5 minutes. A translucent film with a yellow tint was obtained. The film while still wet was dyed for 10 minutes at 70° C. using a disperse dye, 1 gram in 200 mls. of water, Celanthrene Pure Blue BRS (CI 64500). The dyed film was scrubbed in running cold water for 5 minutes and allowed to dry. A translucent film which had a deep bluish-violet color was obtained. A second film sheet was treated directly with the dye solution in the manner described above in this example. A film with only a very faint blue tint was obtained.

Sodium dichromate is preferred for preparing the treatment reagent because of its solubility characteristics. Since chromic acid ($H_2CrO_4$) is the active chemical species in the treatment reagent, it will be understood that effects similar to those achieved by the sodium dichromate/$H_2SO_4$/$H_2O$ system can be achieved by using amounts of other chromic acid-yielding chromium compounds, e.g., $CrO_3$, chromate or dichromate salts (which will give chromic acid in the presence of $H_2SO_4$ and water) to give within solubility limitations an equivalent amount of chromic acid in the treatment reagent.

The composition of the sodium dichromate/$H_2SO_4$/water treatment reagent can vary, as described above, according to the results desired. In some reagent compositions, however, particularly at high sodium dichromate and low water concentrations, upon standing for varying periods of time, a brownish-red solid precipitates, thereby reducing the effective concentration of the treatment reagent solution. It is therefore, preferred that the treatment reagent be used before the brownish-red solid precipitates. The solution may be used after precipitation but treatment results will differ. Precipitations may also be avoided by continuously mixing an aqueous solution of the dichromate with sulfuric acid by means of a proportioning pump, thereby forming and delivering the reagent to the treatment station at the rate at which it is being consumed.

The invention is, of course, not limited to the treatment of the surfaces of the particular polyesters of the foregoing examples. Similar results can be obtained by treating shaped articles composed of any of the high-melting, difficultly soluble, usually microcrystalline, cold-drawing linear, highly polymerized esters of terephthalic acid and glycols of the series $HO(CH_2)_nOH$, where $n$ is an integer within the range of 2 to 10, described in Whinfield et al. Patent 2,465,319. Other useful polyester articles which can be treated include those prepared from highly polymerized esters of terephthalic acid and at least one glycol of the formula $HOCH_2-W_n-CH_2OH$ where $n$ is 0 or 1 and W is methylene or polymethylene alkyl-substituted polymethylene of 1 to 8 carbons, e.g., 2, 2-dimethylpropylene-1,3 or a cycloalkylene radical of 5 to 6 carbon atoms, e.g., cyclopentyl-1,3, and cyclohexyl-1,4. In addition, articles prepared from copolyesters comprising up to 85 mole percent isophthalic acid and 15% or more of terephthalic acid components such as are disclosed in British patent specification 766,290 can be used. Shaped articles comprising up to 20 mole percent of aliphatic dicarboxylic acids based on total moles of acid, e.g., succinic, glutaric, adipic, hexahydroterephthalic and sebacic acids, in addition to at least 15 mole percent terephthalic acid are also useful. The above-described polymers may contain a number (e.g., 1 to 12 or more) of ether groups in the polymer chain. Such ether groups may be added as part of ether containing glycol derivatives or formed by side reactions during polymerization.

The acid treated films, fibers, filaments, etc. should be quenched immediately because the effect of the strong acid will continue until the reagent is either consumed or diluted and removed, e.g., washed off the article surface. Water that is preferably quiescent or non-turbulent is used as the quenching bath so that the swollen surface of the shaped article will not be distorted by currents of water. It is not necessary that the film be quenched in a bath because a fine spray or other washing means which will not affect the treated surface can also be used. While it is preferred that cold water, e.g., 10 to 15° C. be used, warmer water, e.g., at room temperature 25° C. or higher can be used.

The bleach solution for removing the yellow color due to chromium compounds in and on the hydrophilic surfaces of the film preferably consist of aqueous sodium or potassium hydroxide, but other alkali metal hydroxides may be used, e.g., lithium, cesium, and rubidium. The concentration of the alkali metal hydroxide in the solution may vary from 0.5 to 30% by weight and the temperature of the solution may range from 5 to 80° C. The chromic acid treated article should be brought into contact with the aqueous alkali metal hydroxide solution for about 1 second or more. At dilute hydroxide concentrations, the treated article can remain in contact with the hydroxide, however, for an indefinite period without deleterious effect, but as the hydroxide concenration increases, the maximum contact time should be regulated to prevent total dissolution of the treated surface. The preferred contact time is 10 to 60 seconds when a 10 to 20 percent hydroxide solution is used. As the concentration of the alkali increases and/or the temperature is raised, the time required for bleaching decreases. Simultaneously, alkaline hydrolysis of the surface sets in imposing a practical upper limit on the temperature and alkali concentration in the bleach process. When the treated film is dried prior to bleaching, it is preferred that the bleach solution be comprised of 20% alkali and the temperature be maintained at 40° C. The film need not be dried, however, and the color has been essentially bleached out using a 20% alkali solution at room temperature (about 23° C.). At elevated temperatures, however, it is preferred that the treated film base be dried prior to bleaching.

Suitable basic dyes which may be used to dye the treated shaped articles include: Auramine SP (CI 41000), Sevron Yellow R (CI 48055), Chrysoidine GN (CI 11270), Acridine Orange R (CI 46005), Rhodamine 6GDN (CI 45160), Safranine T (50240), Methyl Violet S (CI 42535), Crystal Violet Extra Pure APNX (CI 42555), Indine Blue ZRN (CI 51175), Methylene Blue BX (CI 52015), Malachite Green (CI 42000), Bismarck Brown GN (CI 21000), Congo Red (CI 22120).

Suitable disperse dyes in addition to Celanthrene Pure Blue BRS (CI 64500) include Acetamine Yellow CG (CI 11855), Celliton Fast Yellow 76A-CF (CI 48000), Celliton Orange R (CI 60700), Acetanine Scarlet B (CI 11110), Supracet Fast Pink 2R (CI 60755), Celanthrene Red 3BN (CI 60710), Fenacet Fast Violet 6B (CI 61105), Duranol Brilliant Blue G (CI 61500), etc.

When the shaped article is a film, light-sensitive diazo compositions can be impregnated into the surface of the treated film, e.g., diazonium salts (metallic double salts) of diazotized paraaminoalkylanilines, p-amino-diphenylamines, and 4-benzoylamino-2:5-diethoxyaniline and subsequently developed in phenolic solution, e.g., phloroglucinol, resorcinol, β-naphthol, etc; or a two component system can be used, e.g., ortho and para-hydroxydiazo compounds, e.g., 1-diazo-2-naphthol-4-sulfonic acid or diazotized p-amino-diphenylamine together with a phenolic coupling component. Other diazo compounds useful in the present invention are disclosed by K. H. Saunders in the Aromatic Diazo Compounds, chap. IX, Edward Arnold & Co., London, 1936.

The acid treated films impregnated with the dye or diazo compounds described above can be coated directly with an aqueous solution or dispersion of a water-permeable organic colloid having protective colloid properties, e.g., gelatin, polyvinyl alcohol, etc., or with other layers of light-sensitive photographic films or plates. The water-permeable colloid solution or dispersion may be free from or may contain light-sensitive silver halide grains. It may contain, in addition, opacifying agents or matting agents or other materials used in photographic films. The treated, impregnated films can also be coated with photopolymerizable, image-yielding compositions of the type described in Plambeck U.S. Patents 2,760,863 and 2,791,504 or coated with light-sensitive bichromated gelatin solutions. The dyes chosen for impregnation can be selected to either remain colored or to bleach in the aqueous processing solutions if necessary.

The dyed, treated shaped articles consist of many forms and are useful for many purposes. The fibers, filaments and yarns which have been treated are suitable for the usual textile applications. They may be employed in the knitting or weaving of fabrics of the polyester types disclosed above. The dye impregnated into the surface of the film base may serve as an anti-halation medium, a tinted film for decorative effects and for construction purposes, e.g., in greenhouses, as weather coverings, etc. The film bases which have been impregnated with diazo materials are useful for photographic reproduction, the formation of colored images and as drafting films for soft pencil and ink applications. Drafting films useful for harder pencils can be prepared by impregnating one surface of a film with a diazo compound and coating the opposite surface with a layer containing a toothing agent for use as a drawing surface, e.g., as described in Assignee's Van Stappen application Serial No. 774,822, filed November 19, 1958, now Patent No. 2,964,423.

The instant invention is advantageous because a wide choice of dyes can be applied to the shaped articles so produced to give uniformly dyed surfaces in a matter of seconds by a simple procedure. The speed of the dyeing operation is considerably faster than is known in the art. The diazo impregnated films do not require the use of a binder material but can be impregnated directly into the film surface. By elimination of the use of a binder, the exposed film can be dried, ready for use in about 15 seconds, in room air.

As stated in the second paragraph of this application, processes for improving the dyeability of polyethylene terephthalate are known but are not efficient or impart undesirable properties to the treated shaped articles. Treatments with acids or alkalies, for example, often depend on modification in the physical structure of the shaped article to improve its permeability to dyes; or to hydrolytic degradation resulting in reduced physical properties or excessive shrinkage. Often, the prior art processes require repeated treatments to achieve a satisfactory dye level.

By the processes of this invention, higher levels of dyeability of shaped polyester articles are generally obtained in a short period of time, and the treatment has essentially no effect on the physical properties of the articles. While the mechanism of the treatment reaction is not known, it is apparent that much more is involved than physical modification or hydrolytic degradation of the polyester articles.

It has been found that when polyethylene terephthalate and related polyesters are oxidized with chromic acid, unexpected properties are produced. Moreover, the role of the chromium appears to be a dual one of forming carboxyl groups at selective sites on the polyester molecule while undergoing a change from $Cr^{+6}$-$Cr^{+3}$. Under these very specific conditions, the $Cr^{+3}$ appears to complex with the carboxyl groups at the site of the oxidation to form groups which have a very great affinity for dyes.

Such results could not be obtained by mere oxidation or hydrolysis of the base, even if this were followed by introduction of $Cr^{+3}$ into the base. However, by the unique process of this invention in which the $Cr^{+3}$ is available at the site of the oxidation, superior results are obtained. This is a commercially important advantage of the present invention.

We claim:

1. The process which comprises (a) treating a surface of a shaped article composed of a polyester of (1) at least one glycol of the formula $HOCH_2$—$W_n$—$CH_2OH$ where W is a divalent hydrocarbon radical taken from the group consisting of methylene, unsubstituted and alkylsubstituted polymethylene radicals of 1 to 8 carbon atoms and a cycloalkylene radical of 5 to 6 carbon atoms, and $n$ is a number taken from the group consisting of 0 and 1, and (2) at least one dicarboxylic acid taken from the group consisting of unsubstituted saturated aliphatic dicarboxylic acids and aromatic dicarboxylic acids, said polyester containing at least 15 mole percent of terphthaloyl groups, with a treatment solution comprising 82.0 to 98.8 parts by weight of $H_2SO_4$, 1.0 to 14.5 parts by weight of water and an amount of chromic acid-yielding compound equivalent to 0.1 to 4.0 parts by weight of $Cr_2O_3$, said compound yielding chromic acid in water containing sulfuric acid, for at least about 0.01 second, (b) contacting said treated surface of the shaped article with an excess of water, and (c) contacting said resulting treated surface with an aqueous solution containing a material taken from the class consisting of a basic dye, a disperse dye and a diazo compound.

2. The process which comprises (a) treating a surface of a shaped article composed of a polyester of (1) at least one glycol of the formula $HOCH_2-W_n-CH_2OH$ where W is a divalent hydrocarbon radical taken from the group consisting of methylene, unsubstituted and alkylsubstituted polymethylene radicals of 1 to 8 carbon atoms and a cycloalkylene radical of 5 to 6 carbon atoms, and $n$ is a number taken from the group consisting of 0 and 1, and (2) at least one dicarboxylic acid taken from the group consisting of unsubstituted saturated aliphatic dicarboxylic acids and aromatic dicarboxylic acids, said polyester containing at least 15 mole percent of terphthaloyl groups, with a treatment solution comprising 82.0 to 98.8 parts by weight of $H_2SO_4$, 1.0 to 14.5 parts by weight of water and an amount of chromic acid-yielding compound equivalent to 0.1 to 4.0 parts by weight of $Cr_2O_3$, said compound yielding chromic acid in water containing sulfuric acid for at least about 0.01 second, (b) contacting said treated surface of the shaped article with an excess of water, and (c) contacting said resulting treated wet surface with an aqueous solution containing a material taken from the class consisting of a basic dye, a disperse dye and a diazo compound.

3. A process as set forth in claim 2 wherein between steps (b) and (c) said treated surface of the shaped article is treated for at least one second in an 0.5% to 30% aqueous alkali metal hydroxide solution.

4. A process as set forth in claim 2 wherein between steps (b) and (c) said treated surface of the shaped article is treated for at least one second in an 0.5% to 30% aqueous sodium hydroxide solution.

5. A process as set forth in claim 2 wherein said shaped article is a biaxially oriented polyester film.

6. A process as set forth in claim 2 wherein said shaped article is a biaxially oriented polyethylene terephthalate film.

7. A process as set forth in claim 2 wherein said shaped article is an oriented polyester fiber.

8. A process as defined in claim 1 wherein said material is a light-sensitive diazonium salt.

References Cited in the file of this patent

FOREIGN PATENTS 683,218    Great Britain _____ Nov. 26, 1952